US011421669B2

(12) United States Patent
Lee et al.

(10) Patent No.: US 11,421,669 B2
(45) Date of Patent: Aug. 23, 2022

(54) MOTOR ASSEMBLY AND RECIPROCATION COMPRESSOR INCLUDING MOTOR ASSEMBLY

(71) Applicant: LG ELECTRONICS INC., Seoul (KR)

(72) Inventors: Ki Yeon Lee, Seoul (KR); Jinkook Kim, Seoul (KR); Wonseok Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 1 day.

(21) Appl. No.: 16/852,725

(22) Filed: Apr. 20, 2020

(65) Prior Publication Data

US 2021/0215143 A1 Jul. 15, 2021

(30) Foreign Application Priority Data

Jan. 9, 2020 (KR) .................. 10-2020-0003319

(51) Int. Cl.
| | |
|---|---|
| *H02K 1/18* | (2006.01) |
| *H02K 7/14* | (2006.01) |
| *H02K 5/15* | (2006.01) |
| *F04B 39/10* | (2006.01) |
| *F04B 35/04* | (2006.01) |
| *F04B 39/12* | (2006.01) |

(52) U.S. Cl.
CPC .............. *F04B 35/04* (2013.01); *F04B 39/12* (2013.01); *F04B 39/122* (2013.01); *H02K 1/187* (2013.01)

(58) Field of Classification Search
CPC ............ H02K 7/14; H02K 21/22; H02K 1/18; H02K 1/187; H02K 5/15; H02K 2205/12; F04B 39/10

USPC .................................. 310/63, 91; 417/410.1
See application file for complete search history.

(56) References Cited

U.S. PATENT DOCUMENTS

| | | | | |
|---|---|---|---|---|
| 4,431,383 A | * | 2/1984 | Boehmler | ............. F04B 39/127 |
| | | | | 417/312 |
| 2012/0070324 A1 | * | 3/2012 | Haecker | ................... H02K 7/14 |
| | | | | 417/415 |

(Continued)

FOREIGN PATENT DOCUMENTS

| | | | |
|---|---|---|---|
| DE | 102015121406 A1 * | 8/2016 | ........... H02K 5/1735 |
| JP | 2006-226273 | 8/2006 | |

(Continued)

OTHER PUBLICATIONS

Machine Translation WO2018084292 (Year: 2018).*
Korean Office Action dated Jan. 26, 2021.

*Primary Examiner* — Jose A Gonzalez Quinones
(74) *Attorney, Agent, or Firm* — Ked & Associates, LLP

(57) ABSTRACT

A motor assembly for compressing a fluid by causing a rotational shaft to reciprocate by providing a drive force to the rotational shaft, and a reciprocating compressor including a motor assembly are provided. The motor assembly may include a cylinder block in which a bore is formed and which is penetrated by the rotational shaft, a stator coupled to the cylinder block, a rotor installed at an outer circumferential surface of the stator so as to be rotated by the stator and which is coupled to the rotational shaft so as to rotate together with the rotational shaft, and at least one fastening member that fastens the stator and the cylinder block to each other such that the stator is supported by the cylinder block.

19 Claims, 9 Drawing Sheets

(56) References Cited

U.S. PATENT DOCUMENTS

| | | |
|---|---|---|
| 2017/0009755 A1 | 1/2017 | Yanase |
| 2018/0216609 A1* | 8/2018 | Kawano .................. F04B 53/16 |
| 2019/0229576 A1* | 7/2019 | Miura ...................... H02K 5/15 |

FOREIGN PATENT DOCUMENTS

| | | | |
|---|---|---|---|
| JP | 2017082723 A * | 5/2017 | |
| JP | 6214821 | 10/2017 | |
| WO | WO 2015/170455 | 11/2015 | |
| WO | WO-2018084292 A1 * | 5/2018 | ............... H02K 7/14 |

* cited by examiner

MOTOR ASSEMBLY AND RECIPROCATION COMPRESSOR INCLUDING MOTOR ASSEMBLY

CROSS-REFERENCE TO RELATED APPLICATION(S)

This present application claims the benefit of priority to Korean Patent Application No. 10-2020-0003319, filed in Korea on Jan. 9, 2020, in the Korean Intellectual Property Office, the entire disclosure of which is incorporated herein by reference.

BACKGROUND

1. Field

A motor assembly and a reciprocating compressor including a motor assembly are disclosed herein.

2. Background

A compressor is a device that increases a pressure of gas by compressing the gas. Compressors may include a reciprocating compressor that compresses and releases the gas suctioned into a cylinder by a piston, and a scroll compressor that compresses the gas by relatively rotating two scrolls.

A reciprocating compressor uses a method in which a piston reciprocating inside of a cylinder compresses a fluid introduced into a bore of the cylinder. A rotational shaft installed vertically for the reciprocating motion of the piston rotates at a predetermined speed, and in conjunction therewith, the piston inside of the cylinder reciprocates.

In the case of such a reciprocating compressor, a rotational force is generated from the motor, and the piston thereby compresses the fluid introduced into the bore of the cylinder. As such, installation of the motor should be maintained stably and efficiently. In addition, if unnecessary pressure is transmitted to a member coupled to the motor in the process of transmitting the rotational force generated from the motor to another member, it may cause deformation or breakage of the member.

Accordingly, a structure that allows more stable installation of the motor and efficiently transmits rotational force is closely related to performance improvement of the reciprocating compressor, and technologies related thereto are actively being developed. In connection with such a compressor, U.S. Patent Application Publication No. US 2017/0009755 A1 (hereinafter, referred to as "related art 1"), which is hereby incorporated by reference, discloses a hermetic compressor and a refrigeration device.

More specifically, related art 1 discloses a shaft having a main shaft and an eccentric shaft, a bearing which bears the main shaft, a cylinder, a piston that reciprocates in the cylinder, a stator fixed to an outer circumference of the bearing, and a rotor disposed coaxially with the stator, for example. However, related art 1 discloses structure in which the stator is fixed to the outer circumference of the bearing by press-fitting, and such a press-fitted structure may cause an indentation deformation of the cylinder block boss portion to penetrate into the journal bearing area, resulting in deformation and damage. In addition, when the pressing force with respect to the press-fitted structure is small, the stator may come loose due to an up and down impact, such as falling.

In addition, Japanese Patent Registration No. JP 6214821 (hereinafter, referred to as "related art 2"), which is hereby incorporated by reference, discloses a hermetic compressor and a refrigeration apparatus. More specifically, related art 2 discloses a rotor fixed to a main shaft of a crankshaft, a stator disposed inside of the rotor, a stator fixing member disposed on the minor shaft of the crankshaft, and a configuration in which the stator is fixed to the stator fixing member and the stator fixing member is fixed to a leg portion extending downward from the cylinder block.

However, in order to improve motor efficiency, related art 2 discloses a structure of fixing the stator fixing member to a compression element member in a state in which a gap between an inner circumference of the rotor and an outer circumference of the stator is set to become equal and fixing a sub-bearing to the stator fixing member in a state in which coaxiality with the main bearing has been secured. However, in such a configuration, it may be difficult to assemble a reciprocating compressor due to its relatively complicated structure.

As described above, while there is a need for the motor assembly used in the reciprocating compressor to be easily installable while also securing stability, existing reciprocating compressors are not able to adequately address such need.

BRIEF DESCRIPTION OF THE DRAWINGS

Embodiments will be described in detail with reference to the following drawings in which like reference numerals refer to like elements, and wherein.

DETAILED DESCRIPTION

Figure 1:
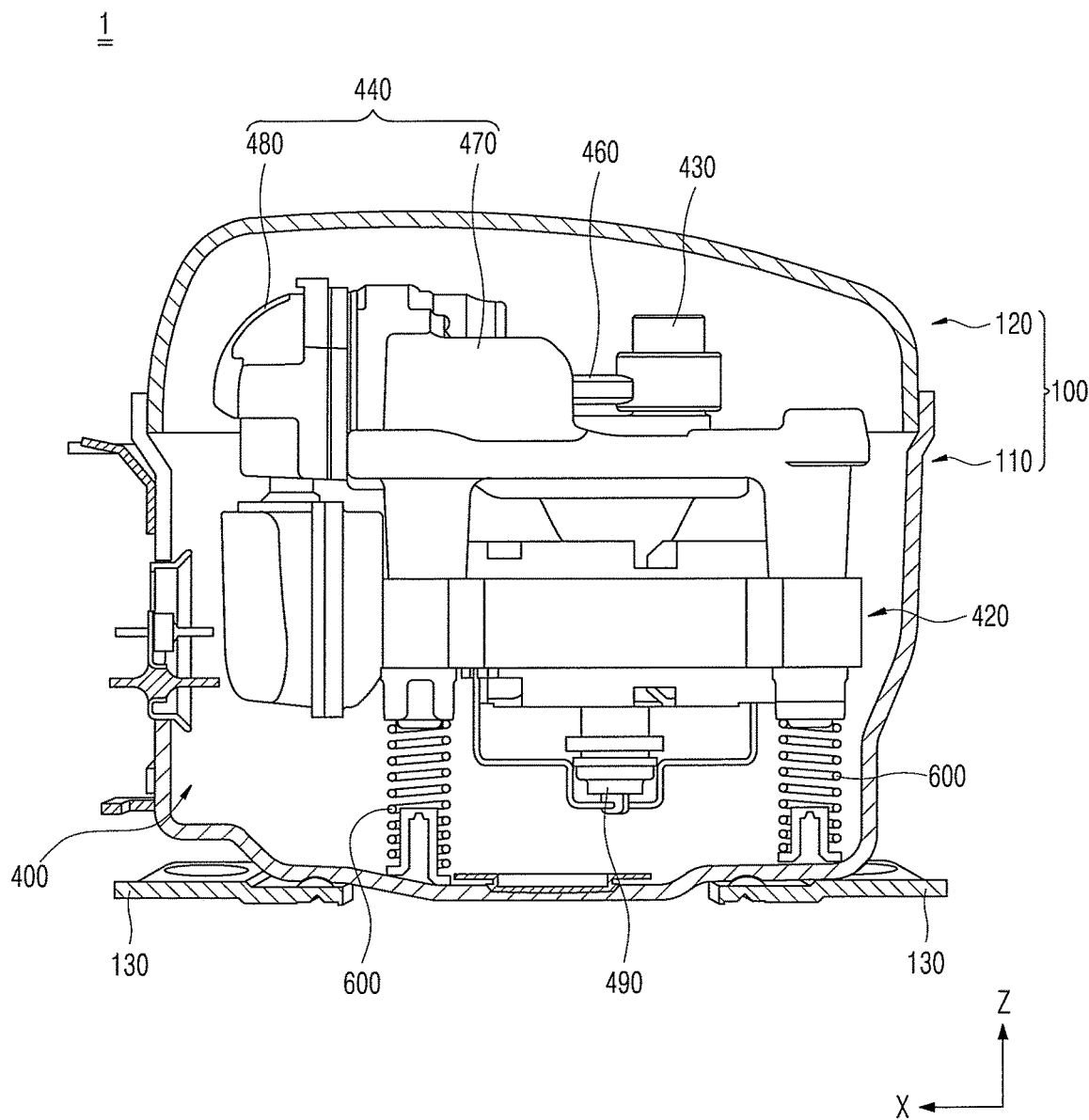
FIG. 1 is a side view illustrating an inside of a shell of a reciprocating compressor according to an embodiment.

Advantages and features of embodiments and methods for achieving them will become apparent from the descriptions of aspects herein below with reference to the accompanying drawings. However, the embodiments are not limited to the aspects disclosed herein but may be implemented in various different forms. The aspects are provided to make the description of embodiments thorough and to fully convey the scope to those skilled in the art. It is to be noted that the scope is defined only by the claims.

The shapes, sizes, ratios, angles, the number of elements given in the drawings are merely exemplary, and thus, embodiments are not limited to the illustrated details. Like reference numerals designate like elements throughout the specification.

In relation to describing the embodiments, when the detailed description of the relevant known technology is determined to unnecessarily obscure the gist, detailed description thereof may be omitted.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "connected to," or "coupled to" another element or layer, it may be directly on, engaged, connected or coupled to the other element or layer, or intervening elements or layers may be present. In contrast, when an element is referred to as being "directly on," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms "first", "second", "third", etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The term "or" is meant to be inclusive, and means either, any, several, or all of the listed items.

While the foregoing has been given by way of illustrative example of this disclosure, all such and other modifications and variations thereto as would be apparent to those skilled in the art are deemed to fall within the broad scope and ambit of this disclosure as is herein set forth.

Hereinafter, embodiments will be described with reference to the accompanying drawings. However, in describing the embodiments, descriptions of already known functions or configurations will be omitted to clarify the gist.

Figure 2:
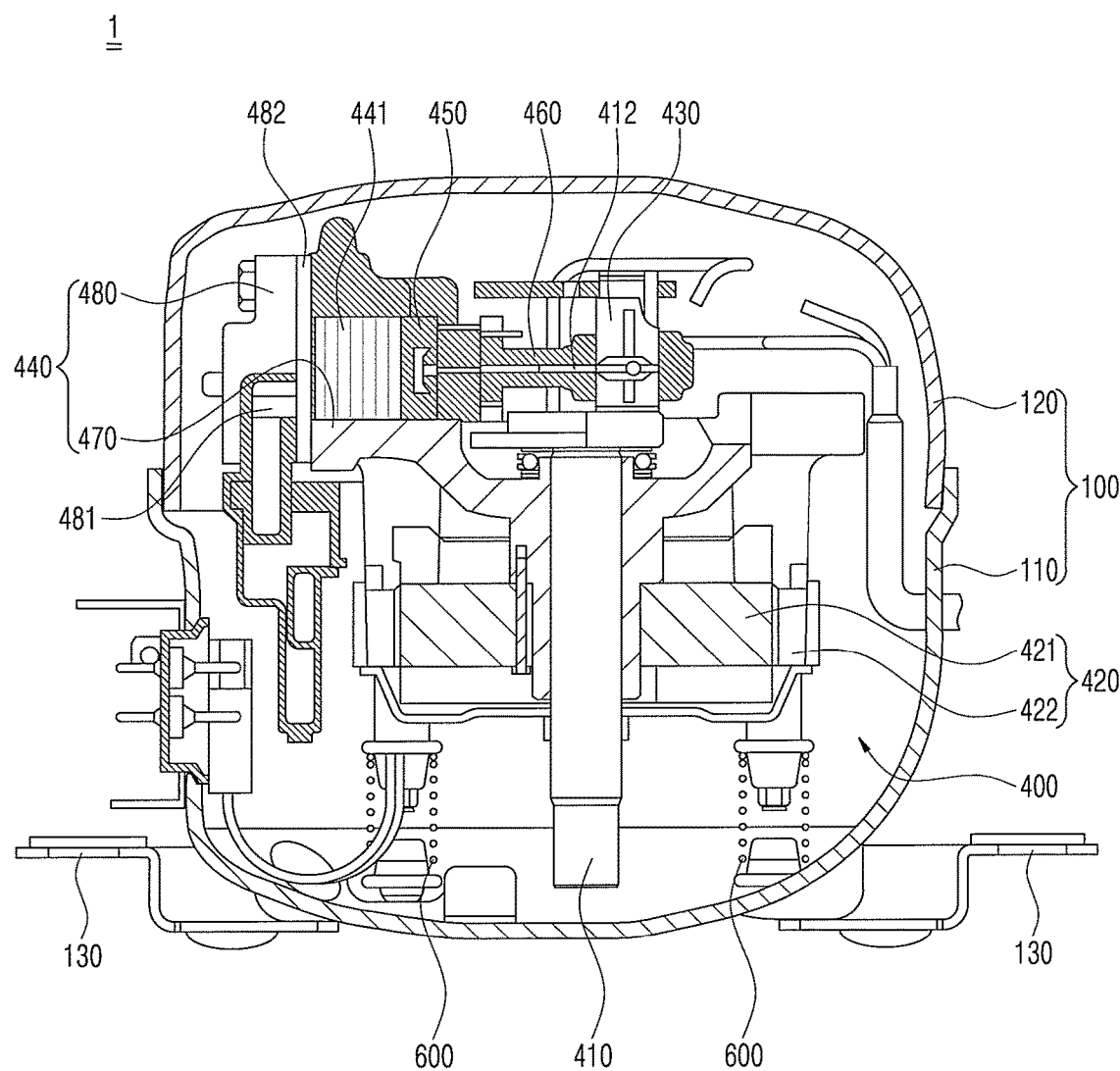
FIG. 2 is a cross-sectional view schematically illustrating a reciprocating compressor according to an embodiment.

FIG. 1 is a side view illustrating an inside of a shell of a reciprocating compressor according to an embodiment. FIG. 2 is a cross-sectional view schematically illustrating a reciprocating compressor according to an embodiment.

A reciprocating compressor 1 (hereinafter, referred to as "compressor 1") according to an embodiment may compress a fluid while a piston 450 reciprocates in conjunction with rotation of a rotational shaft 410 in a space inside of the compressor 1. The fluid may be, for example, gas or gaseous refrigerant.

Hereinafter, components of the compressor 1 and operation of these components will be described. Herein, a refrigerant is described as an example of a fluid.

The compressor 1 may include a shell 100, and the shell 100 may include a lower shell 110 and an upper shell 120. The inside of the shell is sealed from the outside, and the inside of the shell 100 forms the inner space of the compressor 1. Various components of the compressor 1 may be provided inside of the shell 100 (inside of the compressor 1), and lubricating oil may be accommodated. The lubricating oil may be stored on the lower shell 110 and circulated inside of the shell 100.

The lower shell 110 may be formed in a container shape open upward, the upper shell 120 may be formed in a container shape open downward, and the upper portion of the lower shell 110 and the lower portion of the upper shell 120 may be coupled to each other to form a shell 100 forming a sealed inner space. In one embodiment, an upper end of the lower shell 110 and a lower end of the upper shell 120 may be coupled to each other to form a sealed inner space.

Legs 130 may be coupled to an outer surface of the lower shell 110. The legs 130 allow the compressor 1 to be fixed at a specific installation position. For example, when the compressor 1 according to an embodiment forms a refrigerator, the legs 130 may be fixed to a frame constituting the refrigerator such that the compressor 1 is fixed to a specific position of the refrigerator.

Two or more legs 130 may be provided. The legs 130 may be coupled to a lower surface of the lower shell 110.

The inside of the shell may be provided with a main body 400, and various components of the compressor 1 may be coupled to the main body 400. The body may be connected to an inner surface of the shell 100 (the lower shell 110) through an elastic body 600. The elastic body 600 may be formed in the form of a coil spring and a plurality of the elastic body 600 may be provided.

The main body 400 may be provided with a motor 420 that generates power for operation of the compressor 1. The motor 420 may include a stator 421 and a rotor 422. In the compressor 1 according to an embodiment, the motor 420 may be formed such that the stator 421 is formed relatively inward and the rotor 422 is formed relatively outward.

The rotational shaft 410 may be provided at a center of the stator 421, and the rotational shaft 410 may be rotated together with the rotor 422. The rotor 422 and the rotational shaft 410 may be connected to each other through a separate connecting member. The rotational shaft 410 may extend in a vertical direction, that is, a rotational axis of the rotational shaft 410 may extend in the vertical direction.

An oil supply channel 412 through which lubricating oil may flow may be provided inside of the rotational shaft 410. One side of the rotational shaft 410 may be provided with an oil supply unit 490, and at least a portion of the oil supply unit 490 may be immersed in the lubricating oil accommodated in the shell 100. In one embodiment, the oil supply unit 490 may be coupled to a lower end of the rotational shaft 410. As the oil supply unit 490 operates according to rotation of the rotational shaft 410, lubricating oil may move upward along the oil supply channel 412, and lubricating oil discharged from the oil supply channel 412 may be supplied to each component of the compressor 1.

A crank pin 430 may be connected to an upper portion of the rotational shaft 410. The crank pin 430 may be positioned on an upper side of the motor 420. The crank pin 430 may be disposed eccentrically on the axis of rotational of the rotational shaft 410. Therefore, when the rotational shaft 410 rotates, the crank pin 430 may rotate eccentric to the rotational axis of the rotational shaft 410 with a predetermined rotational radius.

A cylinder 440 having a substantially cylindrical shape may be positioned on the upper side of the motor 420 and be disposed in a horizontal direction. The cylinder 440 may be integrally formed with the main body 400 or may be fixedly coupled to the main body 400 after being separately formed.

The piston 450 may reciprocate in a bore 441 in the cylinder 440 along a longitudinal direction of the cylinder 440 (axial direction, frontward-rearward direction of the cylinder 440). In the embodiment, the direction in which the piston 450 reciprocates will be set as the frontward-rearward direction for the description of the embodiment.

A connecting rod 460 may connect the crank pin 430 with the piston 450. The connecting rod 460 may be reciprocally coupled to the crank pin 430 with respect to the axis in the vertical direction, and reciprocally coupled to the piston 450 on the basis of the axis in the vertical direction. Accordingly, when the rotational shaft 410 rotates, the crank pin 430 may rotate eccentrically and the piston 450 may reciprocate in the frontward-rearward direction.

A cylinder cover 480 may be coupled to a front of the cylinder 440. A suction chamber 481 for introducing refrigerant into the cylinder 440 and a discharge chamber 482 for discharging the compressed refrigerant may be provided. The refrigerant may be compressed by operation of the compressor 1 according to the embodiment as described above.

Figure 3:
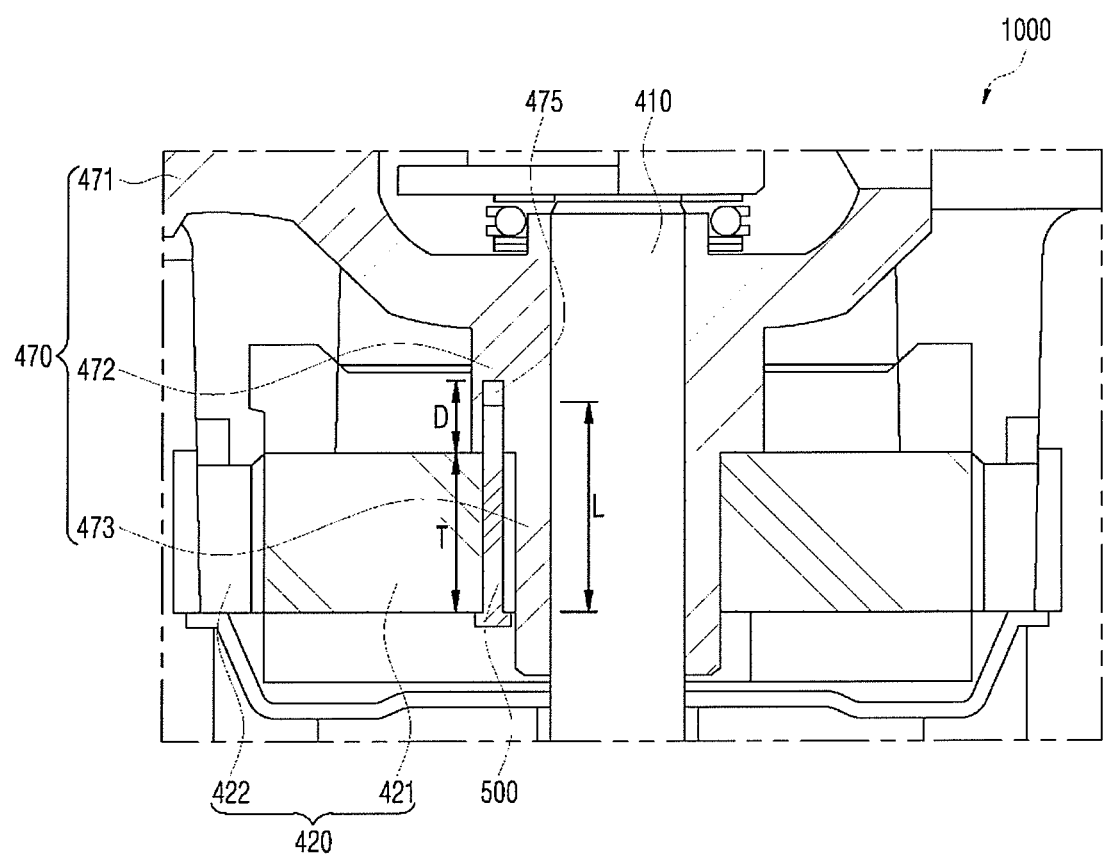
FIG. 3 is a view illustrating a motor assembly in the reciprocating compressor according to an embodiment.
Figure 4:
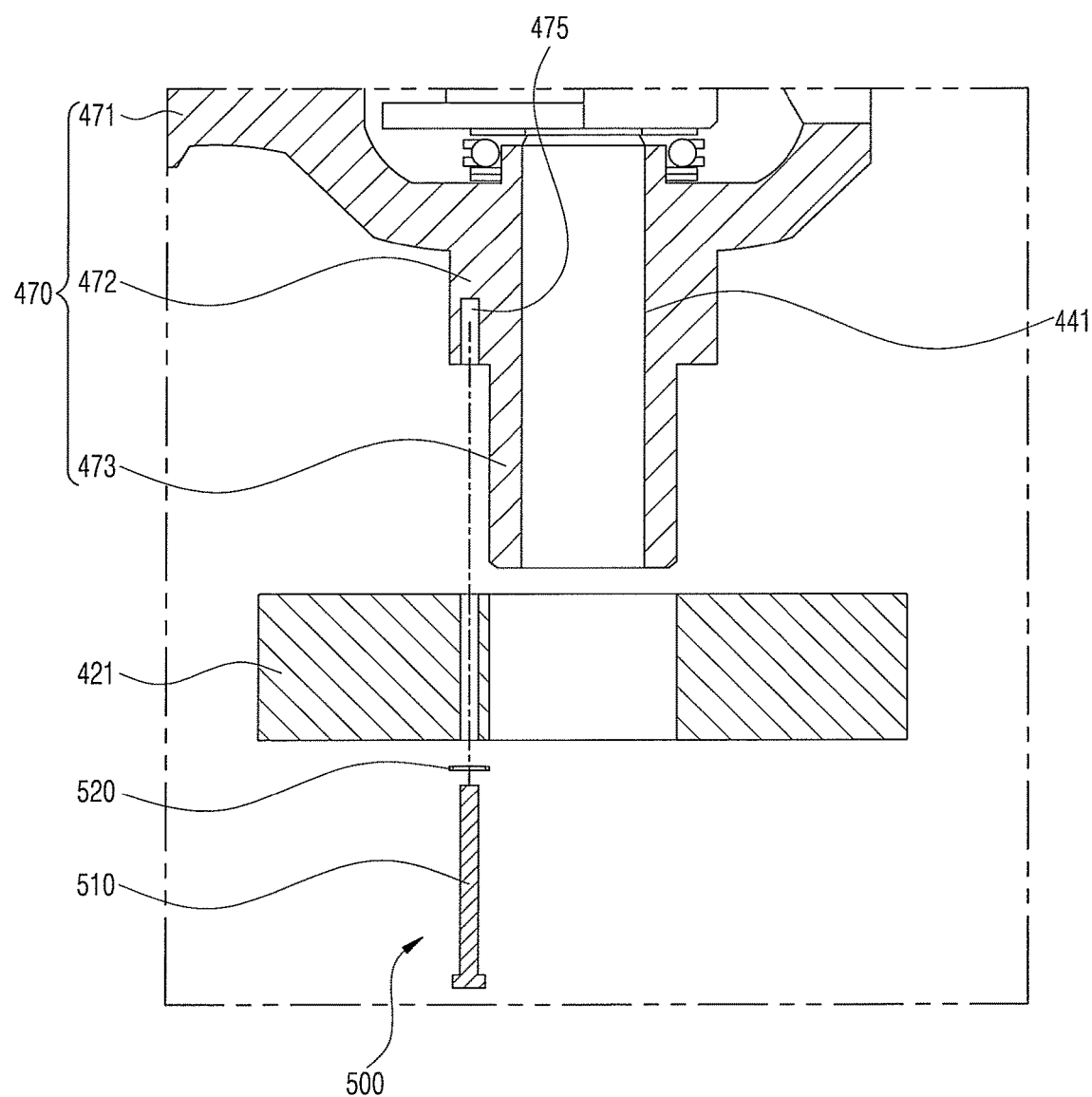
FIG. 4 is a view illustrating an example of a disassembled state of a motor assembly in a reciprocating compressor according to an embodiment.
Figure 5:
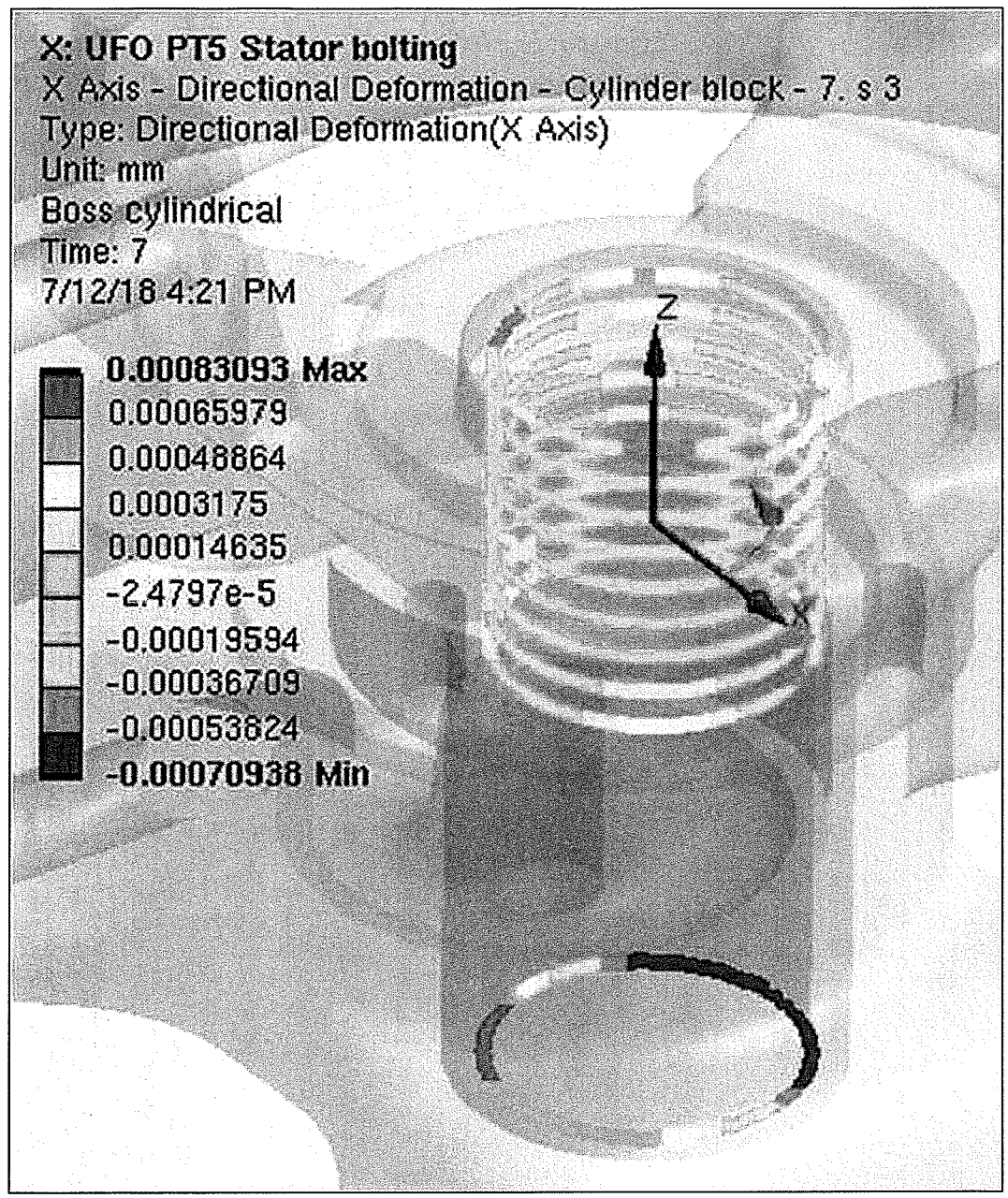
FIGS. 5 to 7 are views exemplarily illustrating structural analysis results of a reciprocating compressor according to an embodiment.
Figure 6:
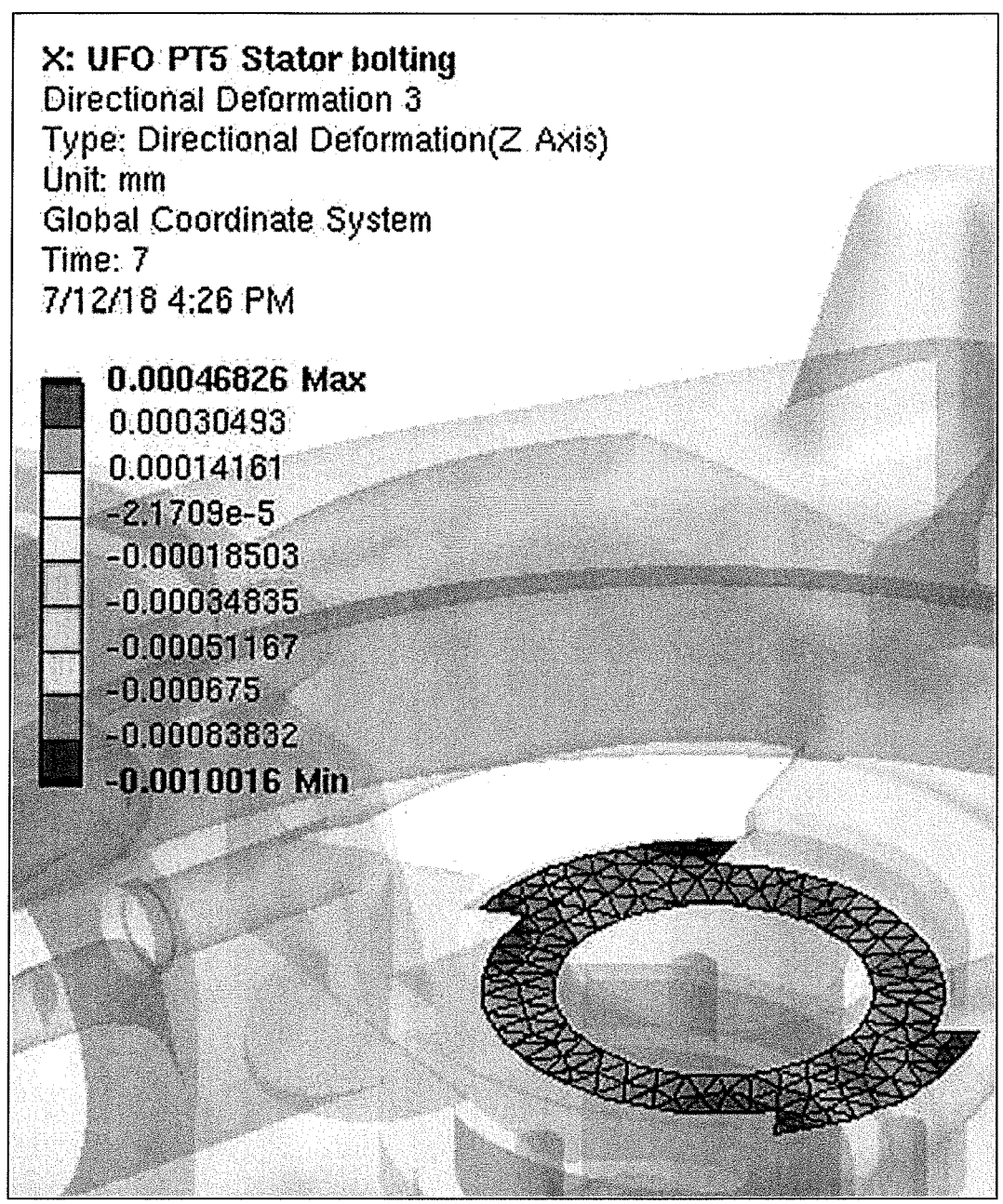
Figure 7:
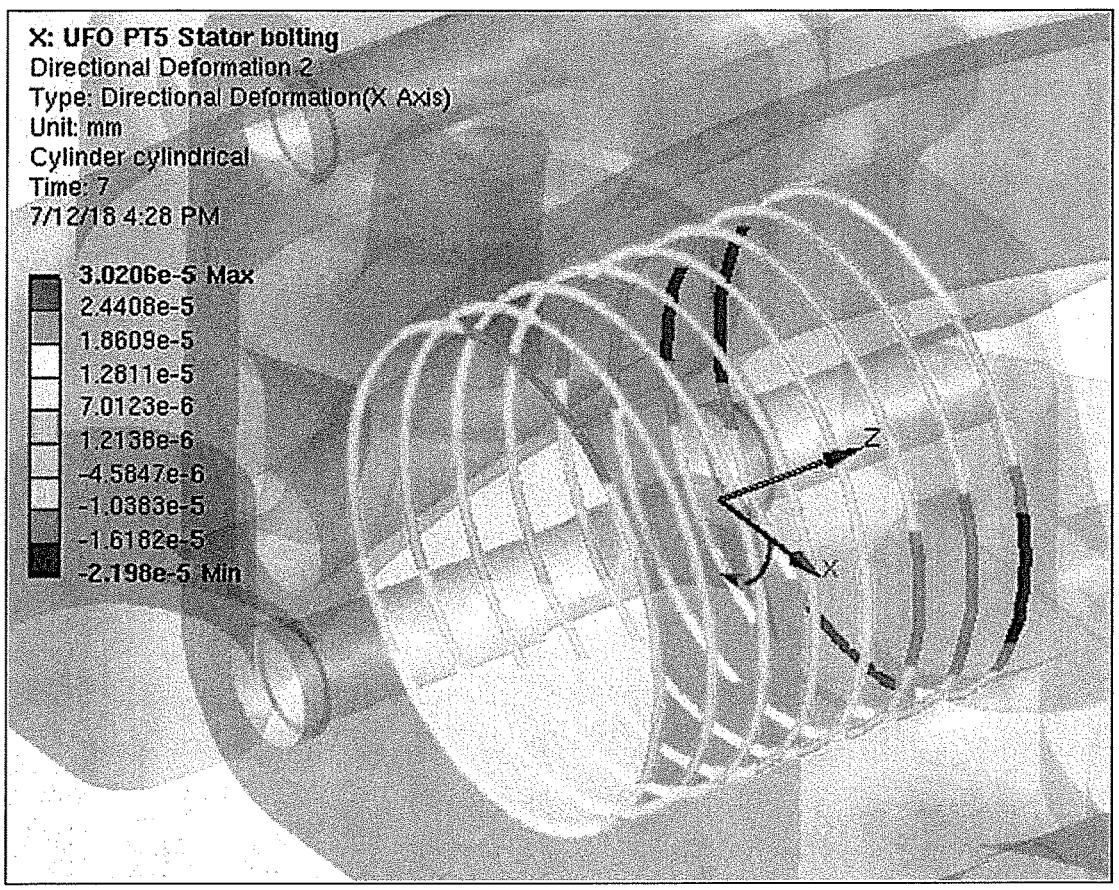

FIG. 3 is a view illustrating a motor assembly in the reciprocating compressor according to an embodiment. FIG. 4 is a view illustrating an example of a disassembled state of a motor assembly in a reciprocating compressor according to an embodiment. FIGS. 5 to 7 are views exemplarily illustrating structural analysis results of a reciprocating compressor according to an embodiment.

A detailed configuration of a motor assembly 1000 according to an embodiment will now be described with reference to FIGS. 3 to 7. The motor assembly 1000 may include a cylinder block 470, a stator 421, a rotor 422, and a fastening member 500.

The cylinder block 470 has bore 441 formed therein, and is penetrated by the rotational shaft 410. As shown in FIGS. 1 and 2, the piston 450 may be inserted in an upper end of the cylinder block 470 to form a main space for compressing refrigerant in the bore 441. That is, the piston 450 reciprocating along the longitudinal direction (horizontal direction) of the bore 441 may be inserted into the upper end of the cylinder block 470.

Further, the cylinder cover 480 may be coupled to the upper end of the cylinder block 470. That is, the cylinder cover 480 may be installed to cover one or a first end of the cylinder block 470, which is an open surface opposite to the other or a second end into which the piston 450 may be inserted. In addition, the cylinder cover 480 may be provided with a suction chamber 481 and a discharge chamber 482 respectively communicating with the bore 441 of the cylinder block 470.

As shown in FIGS. 1 and 2, at a remaining portion of the cylinder block 470, the rotational shaft 410 penetrates the cylinder block 470 and is rotatably coupled thereto. In particular, the stator 421 of the motor 420 may be coupled to the lower end of the cylinder block 470.

The stator 421 may be a stationary part of the motor 420, and may rotate the rotor 422 that is positioned at the outer side relative to the stator 421. As shown in FIGS. 2 and 3, the stator 421 may penetrate and be coupled to a center portion of the cylinder block 470.

The rotor 422 may be installed on the outer circumferential surface of the stator 421 so as to be rotated by the stator 421, and may be coupled to the rotational shaft 410 to rotate together with the rotational shaft 410. That is, the rotor 422, which is not fixed, may rotate by an electromagnetic field generated between the stator 421 and the rotor 422, and the rotational shaft 410 coupled to the rotor 422 by a separate connecting member, for example, may rotate with the rotor 422.

As a result, the crank pin 430 coupled to the rotational shaft 410 may eccentrically rotate, and according to the eccentric rotation, the piston 450 may reciprocate along a transverse direction and compress fluid introduced into the bore 441 of the cylinder 440. Accordingly, in order to efficiently and smoothly transmit rotational force generated from the motor 420, it is necessary to stably maintain an installation state of the motor 420.

In particular, the stator 421 should be stably installed so as to minimize a gap or vibration during the operation process. In this regard, installing the stator 421 to the cylinder block 470 using a method, such as press-fit, may be considered, but in a press-fitted structure, an indentation deformation of a boss portion of the cylinder block 470 may penetrate into a journal bearing area, causing deformation and damage. In addition, when a pressing force for the press-fitted structure is small, the stator 421 may come loose due to up and down impact, such as falling.

Accordingly, the motor assembly 1000 according to an embodiment allows the stator 421 to be coupled to the cylinder block 470 through a separate fastening member 500. That is, as shown in FIGS. 3 and 4, the fastening member 500 is a part for fastening the stator 421 and the cylinder block 470 to each other such that the stator 421 is supported by the cylinder block 470, and the stator 421 and the cylinder block 470 may be coupled to each other only by a mechanical fastening force between the members.

In this regard, structural analysis results for deformation generated when the stator 421 and the cylinder block 470 are coupled through the fastening member 500 will now be described with reference to FIGS. 5 to 7.

FIG. 5 relates to deformation generated in a radial direction of a journal of the cylinder block 470, and it can be seen that a magnitude of the maximum deformation is measured to about 0.8 μm. In this case, the deformation in the radial direction of the journal refers to deformation in an inner diameter portion which is generated while the cylinder block 470 is in contact with the outer circumferential surface of the rotational shaft 410 at the portion penetrated by the rotational shaft 410.

FIG. 6 illustrates deformation generated in a thrust height direction of the cylinder block 470, and the magnitude of the maximum deformation is measured to be about 0.5 μm. In this case, the deformation in the thrust height direction refers to deformation in the axial direction which is generated while the cylinder block 470 supports an axial load of the rotational shaft 410.

FIG. 7 illustrates deformation generated in the radial direction of the bore 441 of the cylinder block 470, and it can be seen that the magnitude of the maximum deformation is measured to be about 0.03 µm. In this case, the deformation in the radial direction of the bore 441 of the cylinder block 470 refers to deformation in an inner diameter portion of the bore 441 that is contacted during reciprocating motion of the piston 450 that receives the transmitted rotational force.

As described above, as the piston 450 which has received the rotational force reciprocates along the lateral direction, all deformations other than in the movement direction may cause frictional losses, resulting in reduced efficiency. However, it can be seen that in the motor assembly 1000 according to an embodiment, the stator 421 and the cylinder block 470 are coupled to each other only by mechanical fastening force between members, and accordingly, unnecessary deformation is very small.

As described above, in the motor assembly 1000 and the reciprocating compressor 1 including the motor assembly 1000, the stator 421 and the cylinder block 470 are fastened to each other through the fastening member 500 to thereby allow the stator 421 to be supported by the cylinder block 470, so that the stator 421 may be coupled to the cylinder block 470 to be stably supported without indentation deformation, for example, for coupling between the members.

In the motor assembly 1000 and the reciprocating compressor 1 including the motor assembly 1000, the cylinder block 470 may include a first block body 471, a second block body 472, and a third block body 473. The first block body 471 is a portion in which the bore 441 is formed, and may be a portion forming the upper end of the cylinder block 470.

The second block body 472 is a portion penetrated by the rotational shaft 410 at the lower portion of the first block body 471, and may be formed such that a penetrated inner circumferential surface thereof contacts an outer circumferential surface of the rotational shaft 410. The third block body 473 is a portion penetrated by the rotational shaft 410 in the lower portion of the second block body 472, and is formed to have a cross-sectional thickness smaller than a cross-sectional thickness of the second block body 472. That is, the third block 473 also has a penetrating inner circumferential surface in contact with the outer circumferential surface of the rotational shaft 410, but the cross-sectional thickness of this portion is relatively smaller than the cross-sectional thickness of the second block body 472.

Accordingly, as shown in FIGS. 3 and 4, a step may be formed at the connection portion between the second block body 472 and the third block body 473.

In addition, according to the structure of the cylinder block 470 as described above, the stator 421 may be penetratingly coupled to an outer circumferential surface of the third block body 473. That is, the penetrated inner circumferential surface of the stator 421 may contact the outer circumferential surface of the third block body 473.

Accordingly, the third block 473 may have a structure in which the stator 421 is coupled to the outer circumferential surface thereof and the rotational shaft 410 is coupled to the inner circumferential surface thereof. In this case, as the cross-sectional thickness of the third block body 473 is smaller than the cross-sectional thickness of the second block body 472 as described above, a size of the through hole of the stator 421 for allowing coupling to the third block body 473 may be minimized.

As such, in the motor assembly 1000 and the reciprocating compressor 1 including the motor assembly 1000, the cylinder block 470 includes first block body 471, second block body 472, and third block body 473, the cross section of which is changed in stages, and the stator 421 is penetratingly coupled to the outer circumferential surface of the third block body 473, such that when the stator 421 and the cylinder block 470 are coupled to each other, a gap in a lateral direction may be limited.

In the motor assembly 1000 and the reciprocating compressor 1 including the motor assembly 1000, an upper surface of the stator 421 may be formed to correspond to a lower surface of the second block body 472 so that the upper surface of the stator 421 may be in close contact with the lower surface of the second block body 472. As described above, a step may be formed at a portion where the second block body 472 and the third block body 473 are connected, and when the stator 421 is coupled to the third block body 473, the upper surface of the stator 421 may be in contact with the step.

Accordingly, as shown in FIGS. 3 and 4, if the upper surface of the stator 421 and the lower surface of the second block body 472 in contact with each other are formed to correspond to each other, when the stator 421 and the third block body 473 are coupled to each other, the upper surface of the stator 421 may be firmly attached to the lower surface of the second block body 472. As such, when the stator 421 and the cylinder block 470 are coupled, the upper surface of the stator 421 is in close contact with the lower surface of the second block body 472, such that the motor 420 is stably supported by the cylinder block 470 and a gap between the members may be minimized during the operation process of the motor 420.

The fastening member 500 may fasten the second block body 472 and the stator 421 to each other. That is, as shown in FIGS. 3 and 4, the stator 421 may penetrate and be coupled to the third block body 473, but the fastening member 500 may be configured to fasten the second block body 472 and the stator 421 to each other.

As described above, as the cross-sectional thickness of the third block body 473 may be relatively small in order to minimize the portion into which the stator 421 penetrates, fastening the fastening member 500 to such a third block body 473 may be disadvantageous with regard to stable fastening. This is because a thickness of the effective member needs to be secured to a portion to which the fastening member 500 is coupled in order to secure fastening between the members. If such an effective thickness is not secured, stress concentration may occur in the corresponding part, which may result in damage or breakage.

Accordingly, the fastening member 500 may be fastened to the second block body 472 having a relatively thicker cross-sectional area than the third block body 473, so that an effective thickness for fastening may be stably ensured. As such, by fastening the stator 421 to the second block body 472 of the cylinder block 470 through the fastening member 500, the stator 421 may be fastened to a portion at which a relatively large effective thickness for fastening may be secured, thereby allowing fastening between the members to be more stably made.

In the motor assembly 1000 and the reciprocating compressor 1 including the motor assembly 1000 according to an embodiment, a fastening hole 475 may be formed in the second block body 472 along a longitudinal direction thereof, and an upper end of the fastening member 500 may be inserted into the fastening hole 475 while penetrating the stator 421 from a bottom upward. That is, as shown in FIGS.

3 and 4, an assembly order of the motor assembly 1000 may be such that, in a state in which the stator 421 has been inserted into the third block 473, the assembly may be completed by inserting the fastening member 500 in the upward direction.

In this case, as relatively different members are arranged in the upper portion of the stator 421, the structure thereof is complicated. However, as there are not many members arranged in the lower portion of the stator 421, a space for assembly may be effectively secured.

Therefore, in a state in which the stator 421 has been inserted into the third block 473, coupling the fastening member 500 from the bottom of the stator 421 in the upward direction may be easily made in a relatively large assembly space. As such, in the motor assembly 1000 and the reciprocating compressor 1 including the motor assembly 1000 according to an embodiment, in a state in which the stator 421 is disposed below the second block body 472, the stator 421 and the cylinder block 470 may be fastened by inserting the fastening member 500 to penetrate the stator 421 from the bottom upward. Accordingly, the installation structure of the motor 420 with respect to the cylinder block 470 may be simplified, thereby making assembly thereof easier.

A length L of the fastening member 500 may be shorter than a sum of a thickness T of the stator 421 and a depth D of the fastening hole 475. That is, as shown in FIG. 3, in a state in which the stator 421 and the cylinder block 470 are fastened through the fastening member 500, an extra space other than a portion into which the fastening member 500 is inserted may be formed in the fastening hole 475.

Vibration may occur during operation of the motor assembly 1000 and the reciprocating compressor 1 including the motor assembly 1000 as described above. In particular, when vibration in the vertical direction occurs, relative vertical movement may also occur between the stator 421, the cylinder block 470, and the fastening member 500. In this case, when the fastening member 500 is inserted into the fastening hole 475 without extra space, the fastening member 500 may be pushed out of the fastening hole 475 by the vertical movement between the members.

As a result, a vertical gap may be generated between the stator 421 and the cylinder block 470, and the gap between the members may directly affect the efficiency of the motor assembly 1000 and the reciprocating compressor 1 including the motor assembly 1000.

As such, in the motor assembly 1000 and the reciprocating compressor 1 including the motor assembly 1000 according to an embodiment, when the stator 421 and the cylinder block 470 are fastened, there is an extra space other than the space in which the fastening member 500 is inserted into the fastening hole 475, so that even when vertical vibration, for example, occurs, separation of the fastening member 500, such as a phenomenon in which the fastening member 500 is pushed out of the fastening hole 475, may be prevented.

In the motor assembly 1000 and the reciprocating compressor 1 including the motor assembly 1000, a screw groove may be formed on the inner circumferential surface of the fastening hole 475, and the fastening member 500 may include a bolt 510 having a screw thread corresponding to the screw groove on the outer circumferential surface thereof. That is, as illustrated in FIGS. 3 and 4, the stator 421 and the cylinder block 470 may be fastened to each other through the bolt 510.

As described above, when the fastening member 500 is fastened by being inserted from the bottom of the stator 421 in the upward direction, the fastening member 500 may fall due to its own weight and external force. Therefore, it is necessary to prevent the fastening member 500 from falling down, so that the fastening member 500 is not separated from the stator 421 and/or the cylinder block 470. In this regard, when the fastening member 500 is made of bolt 510, falling of the fastening member 500 may be prevented to some extent by a coupling force of the screw thread and the screw groove. As such, the fastening member 500 may include a threaded bolt 510, so that the coupling force along the longitudinal direction of the stator 421, the cylinder block 470, and the fastening member 500 may be more stably ensured.

The fastening member 500 may further include a washer 520 interposed between a head of the bolt 510 and the lower surface of the stator 421. As described above, falling of the fastening member 500 may be prevented to some extent by the screw thread structure of the bolt 510, but the fastening member 500 may come loose from the stator 421 and the cylinder block 470 due to, for example, continuous vibration.

Accordingly, washer 520 may be installed between the head of the bolt 510 and the lower surface of the stator 421 to uniformly disperse pressure on a coupling surface and buffer vibration, thereby more effectively preventing loosening between the members.

In this case, the washer 520 may be made of, for example, a flat washer or a spring washer, and thereby improve the coupling force between the head of the bolt 510 and the lower surface of the stator 421. As such, in the motor assembly 1000 and the reciprocating compressor 1 including the motor assembly 1000 according to an embodiment, washer 520 is interposed between the head of the bolt 510 and the stator 421 at the time of fastening the bolt 510 and the stator 421. Accordingly, even when vibration between the members occurs, the bolt 510 may be prevented from being separated in the longitudinal direction.

Figure 8:
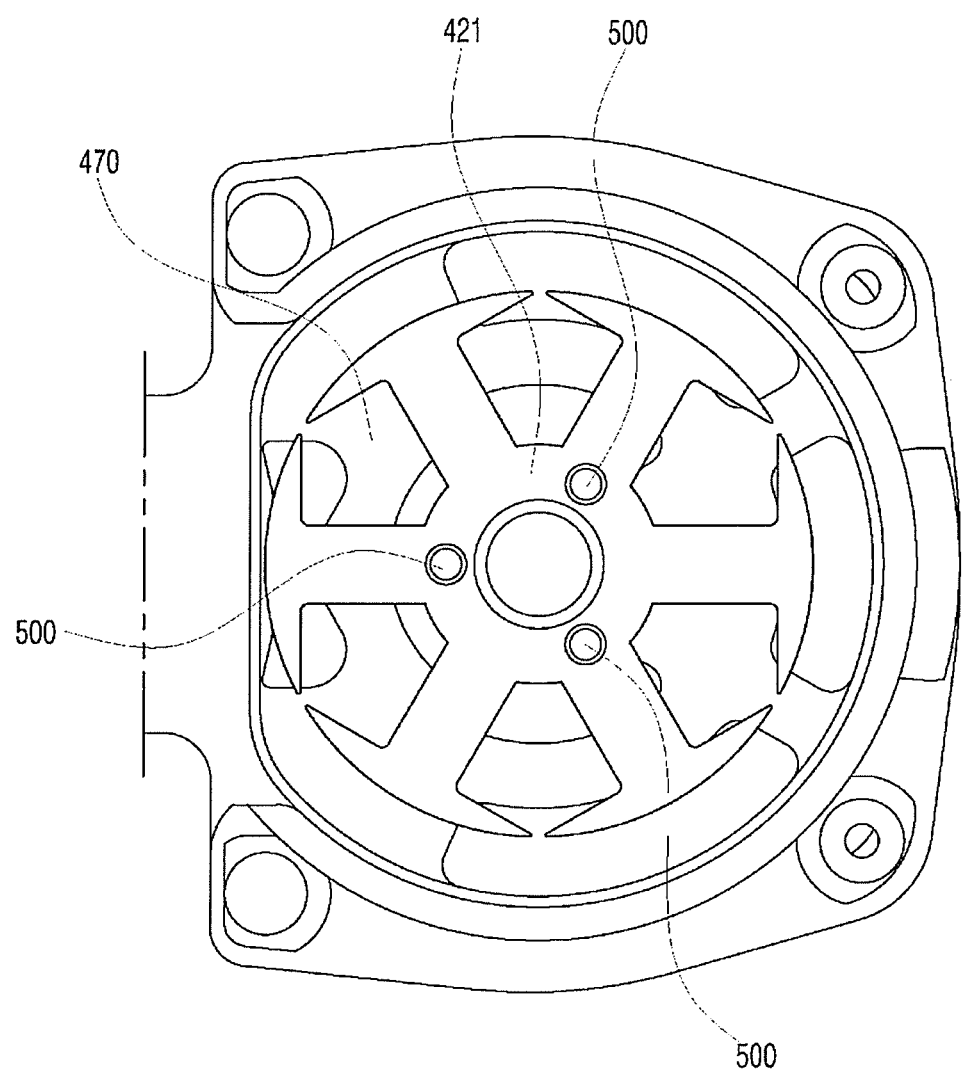
FIG. 8 is a bottom view of a motor assembly in a reciprocating compressor according to an embodiment.

FIG. 8 is a bottom view of a motor assembly in a reciprocating compressor according to an embodiment. As shown in FIG. 8, in the motor assembly 1000 and the reciprocating compressor 1 including the motor assembly 1000 according to an embodiment, a plurality of fastening members 500 may be formed to be in plane symmetrical with the stator 421. That is, a plurality of fastening members 500 may be provided. Each of the plurality of fastening members 500 may be disposed at a constant distance and angle with respect to the adjacent fastening members 500.

At least three fastening members 500 may be provided. When n fastening members 500 are disposed, the fastening members 500 adjacent to each other with respect to the rotational axis of the rotational shaft 410 may be arranged to form an angle of 360°/n. As such, the fastening members 500 may be uniformly disposed on the plane of the stator 421, such that stress due to fastening of the stator 421 and the cylinder block 470 may be evenly distributed.

Figure 9:
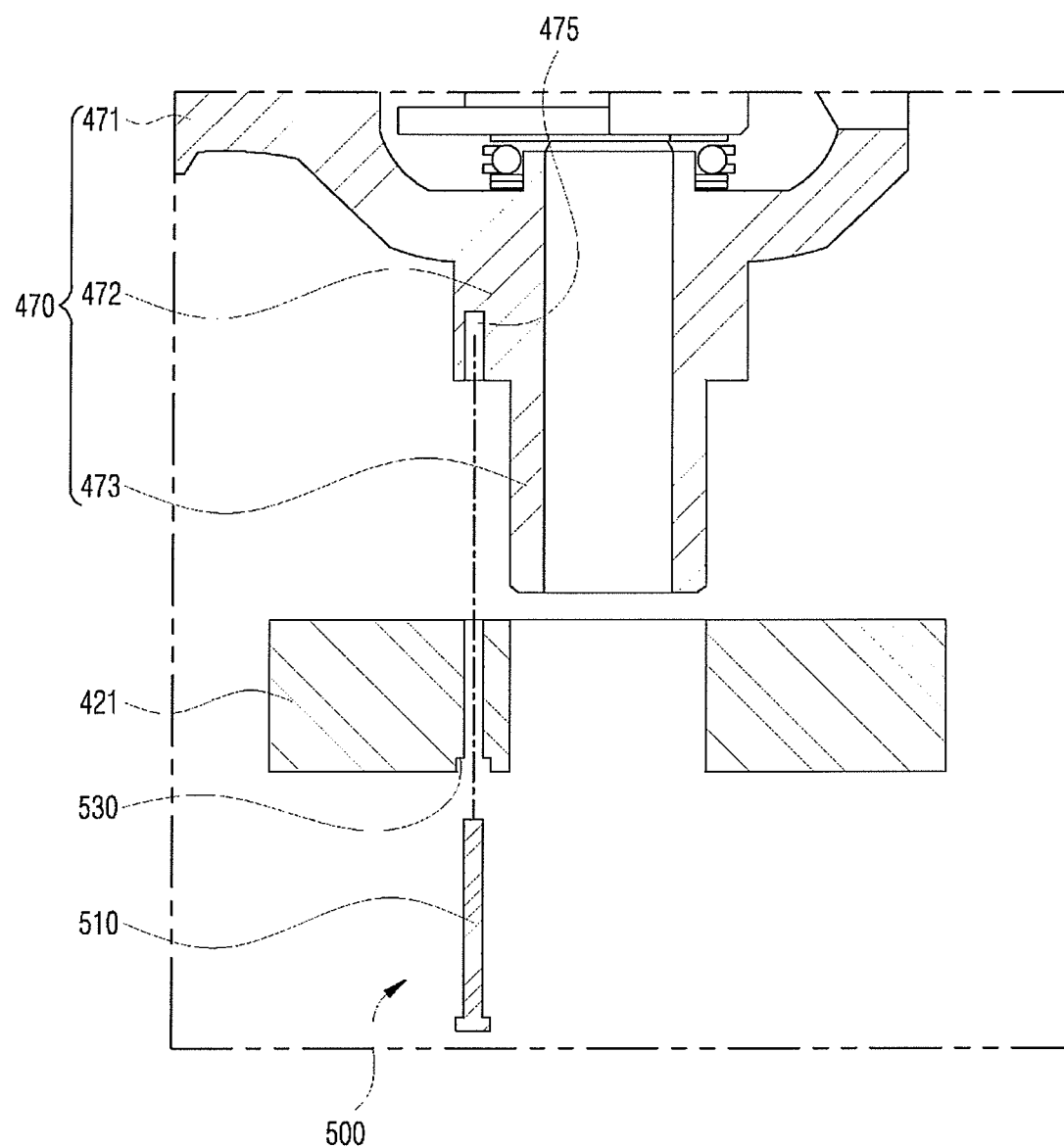
FIG. 9 is a view illustrating a modified example of a disassembled state of a motor assembly in a reciprocating compressor according to an embodiment.

FIG. 9 is a view illustrating a modified example of a disassembled state of a motor assembly in a reciprocating compressor according to an embodiment. As shown in FIG. 9, in the motor assembly 1000 and the reciprocating compressor 1 including the motor assembly 1000, a fastening groove 530 corresponding to the head of the bolt 510 may be formed on the lower surface of the stator 421, and the head of the bolt 510 may be seated in the fastening groove 530.

When the stator 421 and the cylinder block 470 are fastened through the fastening member 500 as described above, the head of the bolt 510 may be exposed to the outside of the stator 421. In this case, other members may contact or collide with the head of the bolt 510, and such contact or collision may reduce the fastening force of the bolt 510.

Therefore, in order for the bolt 510 to be fastened more stably, the head of the bolt 510 may be inserted into the stator 421. To this end, fastening groove 530 may be formed on the lower surface of the stator 421, and the head of the bolt 510 may be seated in the fastening groove 530.

However, while FIG. 9 illustrates a state in which a separate washer 520 is not coupled to the bolt 510, embodiments are not necessarily limited thereto. In this case, the washer 520 may be configured to be seated in the fastening groove 530 together with the head of the bolt 510.

As such, the head of the bolt 510 is seated in the fastening groove 530 formed on the lower surface of the stator 421. Therefore, in a state in which the stator 421 is coupled to the cylinder block 470, protrusion of a portion of the bolt 510 to the outside may be minimized, thereby maintaining a more stable coupling state.

Embodiments disclosed herein are directed to addressing shortcomings associated with existing reciprocating compressors. More specifically, embodiments disclosed herein are directed to optimizing a structure of a motor assembly to ensure reliability of installation thereof without generating unnecessary stress on members coupled to a motor.

Further, embodiments disclosed herein are directed to stably supporting the motor with respect to the members coupled to the motor to thereby minimize a gap between members during the operation process of the motor. Furthermore, embodiments disclosed herein are directed to improving assembly efficiency of a reciprocating compressor by simplifying the structure of a motor assembly including a member to which a motor is coupled and the installation process thereof.

Embodiments are not limited to what has been described above, and other aspects and advantages will be understood by the following description and become apparent from the embodiments.

A motor assembly and a reciprocating compressor including the motor assembly according to embodiments disclosed herein are configured such that a stator of a motor is fastened to a cylinder block. More specifically, the stator and the cylinder block are fastened to each other through a fastening member such that the stator is supported by the cylinder block.

Further, in the motor assembly and the reciprocating compressor including the motor assembly according to embodiments disclosed herein, the cylinder block includes a first block body, a second block body, and a third block body, a cross section of which is changed in stages, and the stator may be penetratingly coupled to the outer circumferential surface of the third block body. Furthermore, the motor assembly and the reciprocating compressor including the motor assembly 1000 according to embodiments disclosed herein are configured to limit a gap in the vertical direction between the stator and the cylinder block. More specifically, the upper surface of the stator is in close contact with the lower surface of the second block body when the stator and the cylinder block are coupled.

In addition, in the motor assembly and the reciprocating compressor including the motor assembly according to embodiments disclosed herein, the stator may be fastened to the second block body of the cylinder block through the fastening member.

Also, the motor assembly and the reciprocating compressor including the motor assembly according to embodiments disclosed herein are configured to facilitate fastening of the stator and the cylinder block through the fastening member. More specifically, in a state in which the stator is disposed on the lower portion of the second block body, the stator and the cylinder block are fastened by inserting the fastening member to penetrate the stator from the bottom upward.

The motor assembly and the reciprocating compressor including the motor assembly according to embodiments disclosed herein may have an extra space other than the space in which the fastening member is inserted into the fastening hole when the stator and the cylinder block are fastened. Fastening members may be arranged uniformly on a plane of the stator.

In addition, the fastening member may include a threaded bolt. A washer may be interposed between the head of the bolt and the stator when the bolt and the stator are fastened.

In addition, the motor assembly and the reciprocating compressor including the motor assembly according to embodiments disclosed herein may be fastened such that the head of the bolt is seated in a fastening groove formed on the lower surface of the stator.

Aspects of the present disclosure are not limited to those mentioned above, and other aspects that are not mentioned above will be clearly understood to one of ordinary skill in the art from the following description.

A motor assembly and a reciprocating compressor including the motor assembly according to embodiments disclosed herein have at least the following advantages.

According to embodiments disclosed herein as a stator and a cylinder block are fastened to each other through a fastening member and the stator is supported by the cylinder block, the stator may be stably coupled to the cylinder block without indentation deformation or the like for coupling between the members. Further, according to embodiments disclosed herein, a cylinder block may include a first block body, a second block body, and a third block body, a cross section of which is changed in stages, and a stator is penetratingly coupled to the outer circumferential surface of the third block body. Accordingly, a gap in the lateral direction may be limited when the stator and the cylinder block are coupled to each other.

Furthermore, according to embodiments disclosed herein, as the upper surface of the stator is in close contact with the lower surface of the second block body when the stator and the cylinder block are coupled, the motor may be stably supported on the cylinder block, and a gap between the members may be minimized during the operation process of the motor. In addition, according to embodiments disclosed herein, as a stator is fastened to a second block body of a cylinder block through a fastening member, fastening between members may be made more stable by fastening the stator to a portion at which a relatively large effective thickness for fastening can be secured.

Also, according to embodiments disclosed herein, in a state in which the stator is disposed below the second block body, by fastening the stator and the cylinder block by inserting the fastening member to penetrate the stator from the bottom upward, the installation structure of the motor with respect to the cylinder block may be simplified and the assembly made easier. As there is an extra space other than the space in which the fastening member is inserted into the fastening hole when the stator and the cylinder block are fastened, even when vertical vibration, for example, occurs, separation of the fastening member, such as a phenomenon in which the fastening member is pushed out of the fastening hole, may be prevented.

As fastening members may be uniformly disposed on a plane of the stator, stress due to the fastening of the stator and the cylinder block may be evenly distributed. As the fastening member may include a threaded bolt, a coupling force along a longitudinal direction of the stator, the cylinder block, and the fastening member may be more stably secured.

Further, a washer may be interposed between the head of the bolt and the stator when the bolt and the stator are fastened, thereby preventing the bolt from being separated along the longitudinal direction even if vibration between members occurs. As the head of the bolt is fastened to be seated in a fastening groove formed in the lower surface of the stator, protrusion of a portion of the bolt to the outside while the stator is coupled to the cylinder block may be minimized, thereby maintaining a stable coupling state.

Further scope of the applicability will become apparent from the following detailed description. However, various changes and modifications within the spirit and scope can be clearly understood by those skilled in the art, and therefore, the detailed description and specific embodiments such as the embodiments should be understood as given by way of example only.

While specific embodiments have been described and illustrated above, it is to be understood that the embodiments are not limited to the described embodiments, and it will be apparent to those skilled in the art that various modifications and variations can be made without departing from the spirit and scope. Therefore, such modifications or variations are not to be understood individually from the technical spirit or point of view, and the modified embodiments will belong to the claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor assembly configured to rotate a rotational shaft about a central axis by providing a drive force to the rotational shaft, the motor assembly comprising:
   a cylinder block having a bore formed therein and at least one fastening hole formed along a longitudinal direction, the cylinder block being configured to be penetrated by the rotational shaft;
   a stator configured to be coupled to the cylinder block;
   a rotor configured to be installed at an outer circumferential surface of the stator so as to be rotated by the stator, and configured to be coupled to the rotational shaft so as to rotate together with the rotational shaft; and
   at least one fastening member configured to penetrate the stator in the longitudinal direction and being inserted into the at least one fastening hole to fasten the stator and the cylinder block to each other such that the stator is supported by the cylinder block, wherein a length of the at least one fastening member is shorter than a sum of a thickness of the stator and a depth of the at least one fastening hole, wherein the at least one fastening hole has an extra space into which the at least one fastening member may be additionally inserted other than a space in which the at least one fastening member is inserted into the at least one fastening hole while the stator and the cylinder block are fastened to each other by the at least one fastening member, wherein the at least one fastening member comprises a bolt, wherein a fastening groove corresponding to a head of the bolt is formed on a surface of the stator, and wherein the head of the bolt is seated in the fastening groove such that the head of the bolt is inserted into the stator.

2. The motor assembly of claim 1, wherein the cylinder block comprises:
a first block body;
a second block body configured to be penetrated by the rotational shaft at a lower portion of the first block body; and
a third block body configured to be penetrated by the rotational shaft at a lower portion of the second block body, and to have a cross-sectional thickness smaller than a cross-sectional thickness of the second block body, and wherein the stator is penetratingly coupled to an outer circumferential surface of the third block body.

3. The motor assembly of claim 2, wherein an upper surface of the stator corresponds to a lower surface of the second block body such that the upper surface of the stator is in contact with the lower surface of the second block body.

4. The motor assembly of claim 3, wherein the at least one fastening member fastens the second block body and the stator to each other.

5. The motor assembly of claim 4, wherein the at least one fastening hole is formed in the second block body along the longitudinal direction, and wherein the at least one fastening member penetrates the stator from a bottom of the stator in an upward direction, and an upper end of the at least one fastening member is inserted into the at least one fastening hole.

6. The motor assembly of claim 5, wherein a screw groove is formed on an inner circumferential surface of the at least one fastening hole, and wherein the at least one fastening member comprises the bolt having a screw thread, corresponding to the screw groove, formed on an outer circumferential surface of the at least one fastening member.

7. The motor assembly of claim 6, wherein the at least one fastening member further comprises a washer interposed between a head of the bolt and a lower surface of the stator.

8. The motor assembly of claim 6, wherein the fastening groove corresponding to the head of the bolt is formed on a lower surface of the stator, and wherein the head of the bolt is seated in the fastening groove.

9. The motor assembly of claim 1, wherein the at least one fastening member comprises a plurality of fastening members symmetrically disposed in a plane on the stator.

10. A reciprocating compressor, comprising:
a shell configured to form a sealed space and in which lubricating oil is accommodated;
the rotational shaft configured to be rotatably installed in the shell;
the motor assembly of independent claim 1, which is configured to rotate the rotational shaft about the central axis;
a crank pin configured to be positioned on an upper side of the motor assembly, the crank pin being disposed eccentrically on the rotational shaft to rotate therewith;
a cylinder configured to be positioned at an upper side of the motor assembly, the cylinder being disposed in a horizontal direction;
a piston configured to reciprocate inside of the cylinder; and
a connecting rod configured to connect the crank pin to the piston.

11. The reciprocating compressor of claim 10, wherein the cylinder block comprises:
a first block body;
a second block body configured to be penetrated by the rotational shaft at a lower portion of the first block body; and
a third block body configured to be penetrated by the rotational shaft at a lower portion of the second block body, and to have a cross-sectional thickness smaller than a cross-sectional thickness of the second block body, and wherein the stator is penetratingly coupled to an outer circumferential surface of the third block body.

12. The reciprocating compressor of claim 11, wherein an upper surface of the stator is formed to correspond to a lower surface of the second block body such that the upper surface of the stator is in close contact with the lower surface of the second block body.

13. The reciprocating compressor of claim 12, wherein the at least one fastening member fastens the second block body and the stator to each other.

14. The reciprocating compressor of claim 13, wherein the at least one fastening hole is formed in the second block body along the longitudinal direction, and wherein the at least one fastening member penetrates the stator from a bottom of the stator in an upward direction, and an upper end of the at least one fastening member is inserted into the fastening hole.

15. A motor assembly configured to rotate a rotational shaft about a central axis by providing a drive force to the rotational shaft, the motor assembly comprising:
a cylinder block having a bore formed therein configured to receive the rotational shaft that extends therethrough and at least one fastening hole formed along a longitudinal direction;
a stator coupled to the cylinder block;
a rotor installed at an outer circumferential surface of the stator so as to be rotated by the stator, and coupled to the rotational shaft so as to rotate together with the rotational shaft; and
at least one fastening bolt configured to penetrate the stator in the longitudinal direction and being inserted into the at least one fastening hole to fasten the stator and the cylinder block to each other such that the stator is supported by the cylinder block, wherein a length of the at least one fastening bolt is shorter than a sum of a thickness of the stator and a depth of the at least one fastening hole, wherein the at least one fastening hole has an extra space into which the fastening bolt may be additionally inserted other than a space in which the at least one fastening bolt is inserted into the at least one fastening hole while the stator and the cylinder block are fastened to each other by the at least one fastening bolt, wherein a fastening groove corresponding to a head of the at least one fastening bolt is formed on a surface of the stator, and wherein the head of the at least one fastening bolt is seated in the fastening groove such that the head of the bolt is inserted into the stator.

16. The motor assembly of claim 15, wherein the cylinder block comprises:
- a first block body;
- a second block body at a lower portion of the first block body; and
- a third block body at a lower portion of the second block body, and having a cross-sectional thickness smaller than a cross-sectional thickness of the second block body, and wherein the stator is coupled to an outer circumferential surface of the third block body.

17. The motor assembly of claim 16, wherein an upper surface of the stator corresponds to a lower surface of the second block body such that the upper surface of the stator is in contact with the lower surface of the second block body, wherein the at least one fastening hole is formed in the second block body along the longitudinal direction, and wherein the at least one fastening bolt penetrates the stator from a bottom of the stator in an upward direction, and an upper end of the at least one fastening bolt is inserted into the at least one fastening hole.

18. The motor assembly of claim 17, wherein the fastening groove corresponding to the head of the at least one fastening bolt is formed on a lower surface of the stator, and wherein the head of the at least one fastening bolt is seated in the fastening groove.

19. The motor assembly of claim 7, wherein the washer is a flat washer or a spring washer.

* * * * *